United States Patent
Zorgui et al.

(10) Patent No.: US 12,408,110 B2
(45) Date of Patent: Sep. 2, 2025

(54) SIDELINK SYNCHRONIZATION RULES BASED ON NETWORK ENERGY SAVING MODE

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 18/064,751

(22) Filed: Dec. 12, 2022

(65) Prior Publication Data

US 2024/0196322 A1  Jun. 13, 2024

(51) Int. Cl.
*H04W 52/00* (2009.01)
*H04W 52/02* (2009.01)
*H04W 56/00* (2009.01)

(52) U.S. Cl.
CPC ..... *H04W 52/0216* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 11,457,419 B2* | 9/2022 | Takeda | H04W 52/34 |
| 2015/0215830 A1* | 7/2015 | Dalsgaard | H04W 36/0088 |
| | | | 455/444 |
| 2020/0077237 A1* | 3/2020 | Upadhya | H04W 72/30 |
| 2021/0076278 A1* | 3/2021 | Tang | H04W 24/08 |
| 2021/0377871 A1* | 12/2021 | Zhao | H04W 52/242 |
| 2023/0254817 A1* | 8/2023 | Zhao | H04B 17/328 |
| | | | 370/329 |

OTHER PUBLICATIONS

Intel Corporation: "Design of UE Sidelink Power Saving Solutions", 3GPP TSG RAN WG1 Meeting #104-E, R1-2100672, 3rd Generation Partnership Project, Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021, XP0519711421, pp. 1-19, XP051971142, Paragraph [05.7].
International Search Report and Written Opinion—PCT/US2023/078914—ISA/EPO—Mar. 1, 2024.

* cited by examiner

*Primary Examiner* — Brandon M Renner
(74) *Attorney, Agent, or Firm* — Harrity & Harrity, LLP

(57) ABSTRACT

Various aspects of the present disclosure generally relate to wireless communication. In some aspects, a user equipment (UE) may receive a mapping indication that indicates a mapping between a plurality of network energy saving modes and a plurality of priority rules for sidelink synchronization. The UE may receive a network energy saving mode indication that indicates scheduling for one or more network energy saving modes of the plurality of network energy saving modes. The UE may perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization. Numerous other aspects are described.

30 Claims, 12 Drawing Sheets

SIDELINK SYNCHRONIZATION RULES BASED ON NETWORK ENERGY SAVING MODE

FIELD OF THE DISCLOSURE

Aspects of the present disclosure generally relate to wireless communication and to techniques and apparatuses for sidelink synchronization based on a network energy saving mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a mapping indication that indicates a mapping between a plurality of network energy saving modes and a plurality of priority rules for sidelink synchronization. The one or more processors may be configured to receive a network energy saving mode indication that indicates scheduling for one or more network energy saving modes of the plurality of network energy saving modes. The one or more processors may be configured to perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

Some aspects described herein relate to a network node for wireless communication. The network node may include a memory and one or more processors coupled to the memory. The one or more processors may be configured to transmit a mapping indication that indicates a mapping between a plurality of network energy saving modes and a plurality of priority rules for sidelink synchronization by a UE. The one or more processors may be configured to transmit a network energy saving mode indication that indicates scheduling for one or more network energy saving modes of the plurality of network energy saving modes.

Some aspects described herein relate to a method of wireless communication performed by a UE. The method may include receiving a mapping indication that indicates a mapping between a plurality of network energy saving modes and a plurality of priority rules for sidelink synchronization. The method may include receiving a network energy saving mode indication that indicates scheduling for one or more network energy saving modes of the plurality of network energy saving modes. The method may include performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

Some aspects described herein relate to a method of wireless communication performed by a network node. The method may include transmitting a mapping indication that indicates a mapping between a plurality of network energy saving modes and a plurality of priority rules for sidelink synchronization by a UE. The method may include transmitting a network energy saving mode indication that indicates scheduling for one or more network energy saving modes of the plurality of network energy saving modes.

Some aspects described herein relate to a non-transitory computer-readable medium that stores a set of instructions for wireless communication by a UE. The set of instructions, when executed by one or more processors of the UE, may cause the UE to receive a mapping indication that indicates a mapping between a plurality of network energy saving modes and a plurality of priority rules for sidelink synchronization. The set of instructions, when executed by one or more processors of the UE, may cause the UE to receive a network energy saving mode indication that indicates scheduling for one or more network energy saving modes of the plurality of network energy saving modes. The set of instructions, when executed by one or more processors of the UE, may cause the UE to perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

Some aspects described herein relate to a non-transitory computer-readable medium that stores a set of instructions for wireless communication by a network node. The set of instructions, when executed by one or more processors of the network node, may cause the network node to transmit a mapping indication that indicates a mapping between a plurality of network energy saving modes and a plurality of priority rules for sidelink synchronization by a UE. The set of instructions, when executed by one or more processors of the network node, may cause the network node to transmit a network energy saving mode indication that indicates scheduling for one or more network energy saving modes of the plurality of network energy saving modes.

Some aspects described herein relate to an apparatus for wireless communication. The apparatus may include means for receiving a mapping indication that indicates a mapping between a plurality of network energy saving modes and a plurality of priority rules for sidelink synchronization. The apparatus may include means for receiving a network energy saving mode indication that indicates scheduling for one or more network energy saving modes of the plurality of network energy saving modes. The apparatus may include means for performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

Some aspects described herein relate to an apparatus for wireless communication. The apparatus may include means for transmitting a mapping indication that indicates a mapping between a plurality of network energy saving modes and a plurality of priority rules for sidelink synchronization by a UE. The apparatus may include means for transmitting a network energy saving mode indication that indicates scheduling for one or more network energy saving modes of the plurality of network energy saving modes.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
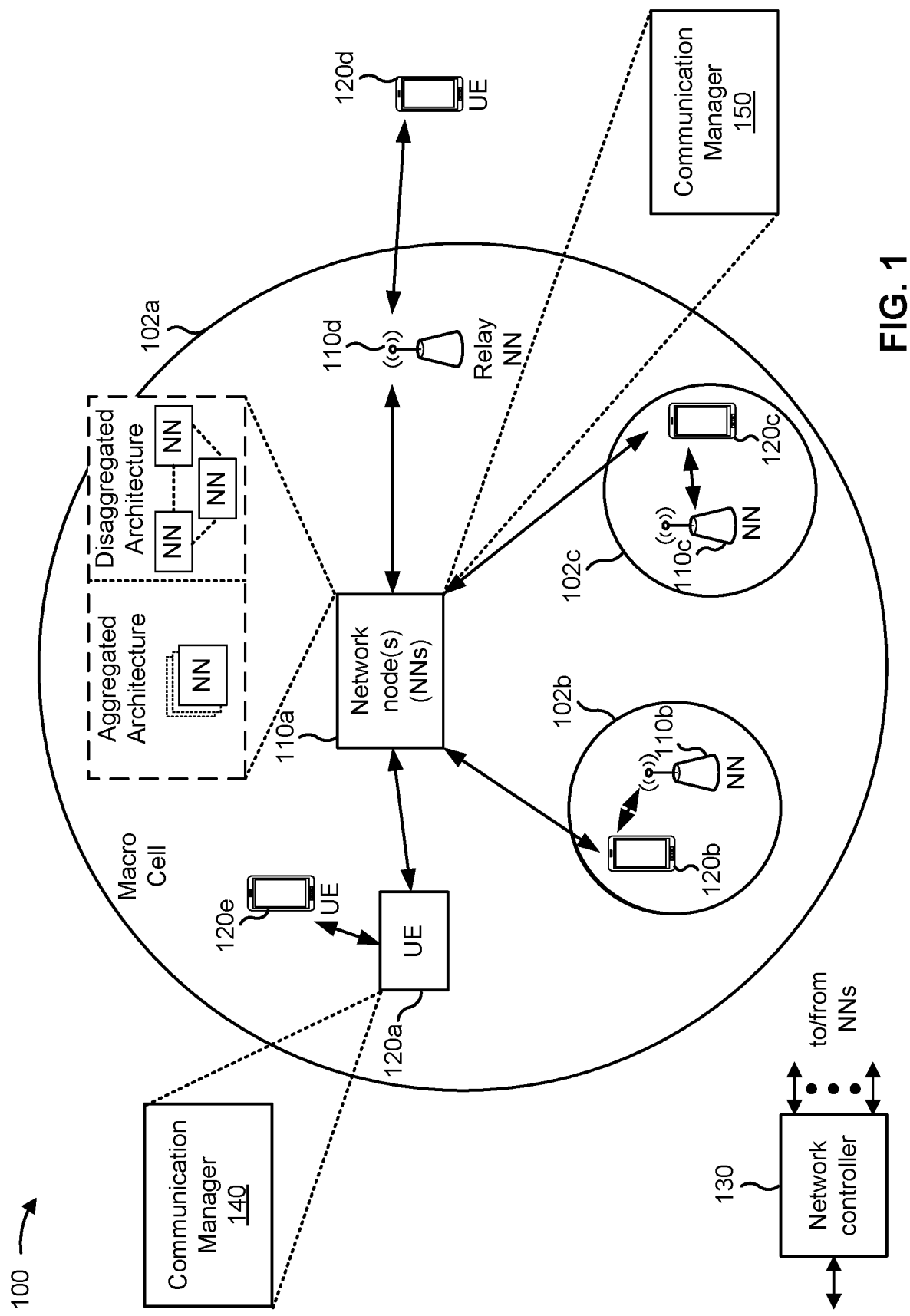
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a mapping indication that indicates a mapping between a plurality of network energy saving (NES) modes and a plurality of priority rules for sidelink synchronization; receive an NES mode indication that indicates scheduling for one or more NES modes of the plurality of NES modes; and perform sidelink synchronization in accordance with a priority rule of the plurality of priority rules for sidelink synchronization based at least in part on the scheduling for the one or more NES modes and the mapping between the plurality of NES modes and the plurality of priority rules for sidelink synchronization. Additionally, or alternatively, the communication manager 140 may perform one or more other operations described herein.

In some aspects, the network node 110 may include a communication manager 150. As described in more detail elsewhere herein, the communication manager 150 may transmit a mapping indication that indicates a mapping between a plurality of NES modes and a plurality of priority rules for sidelink synchronization by a UE; and transmit an NES mode indication that indicates scheduling for one or more NES modes of the plurality of NES modes. Additionally, or alternatively, the communication manager 150 may perform one or more other operations described herein.

As indicated above, FIG. 1 is provided as an example. Other examples may differ from what is described with regard to FIG. 1.

Figure 2:
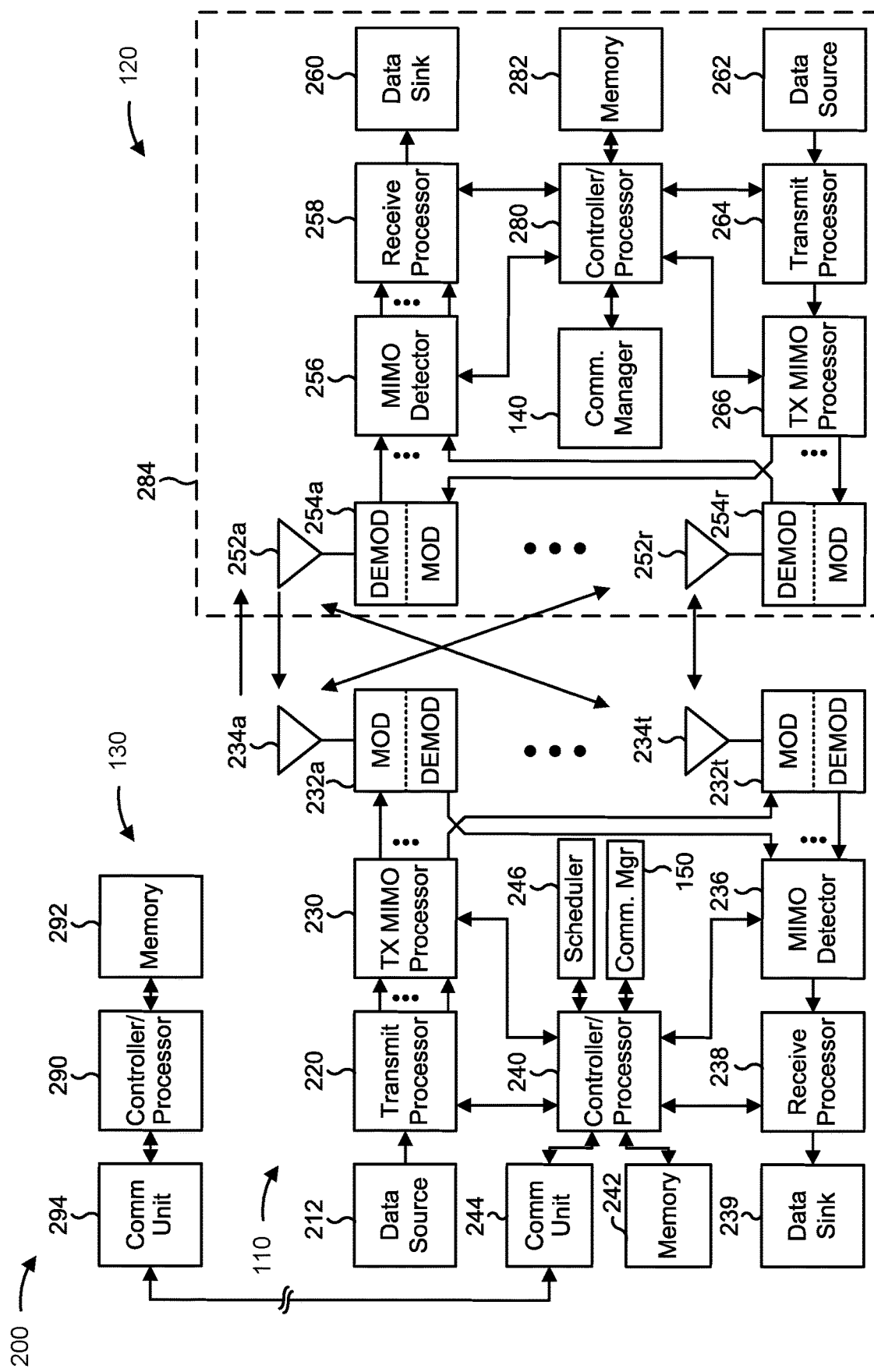
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network node 110, the controller/processor 280 of the UE 120, and/or any other component(s) of FIG. 2 may perform one or more techniques associated with sidelink synchronization based on an NES mode, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a mapping indication that indicates a mapping between a plurality of NES modes and a plurality of priority rules for sidelink synchronization; means for receiving an NES mode indication that indicates scheduling for one or more NES modes of the plurality of NES modes; and/or means for performing sidelink synchronization in accordance with a priority rule of the plurality of priority rules for sidelink synchronization based at least in part on the scheduling for the one or more NES modes and the mapping between the plurality of NES modes and the plurality of priority rules for sidelink synchronization. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a mapping indication that indicates a mapping between a plurality of NES modes and a plurality of priority rules for sidelink synchronization by a UE; and/or means for transmitting an NES mode indication that indicates scheduling for one or more NES modes of the plurality of NES modes. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
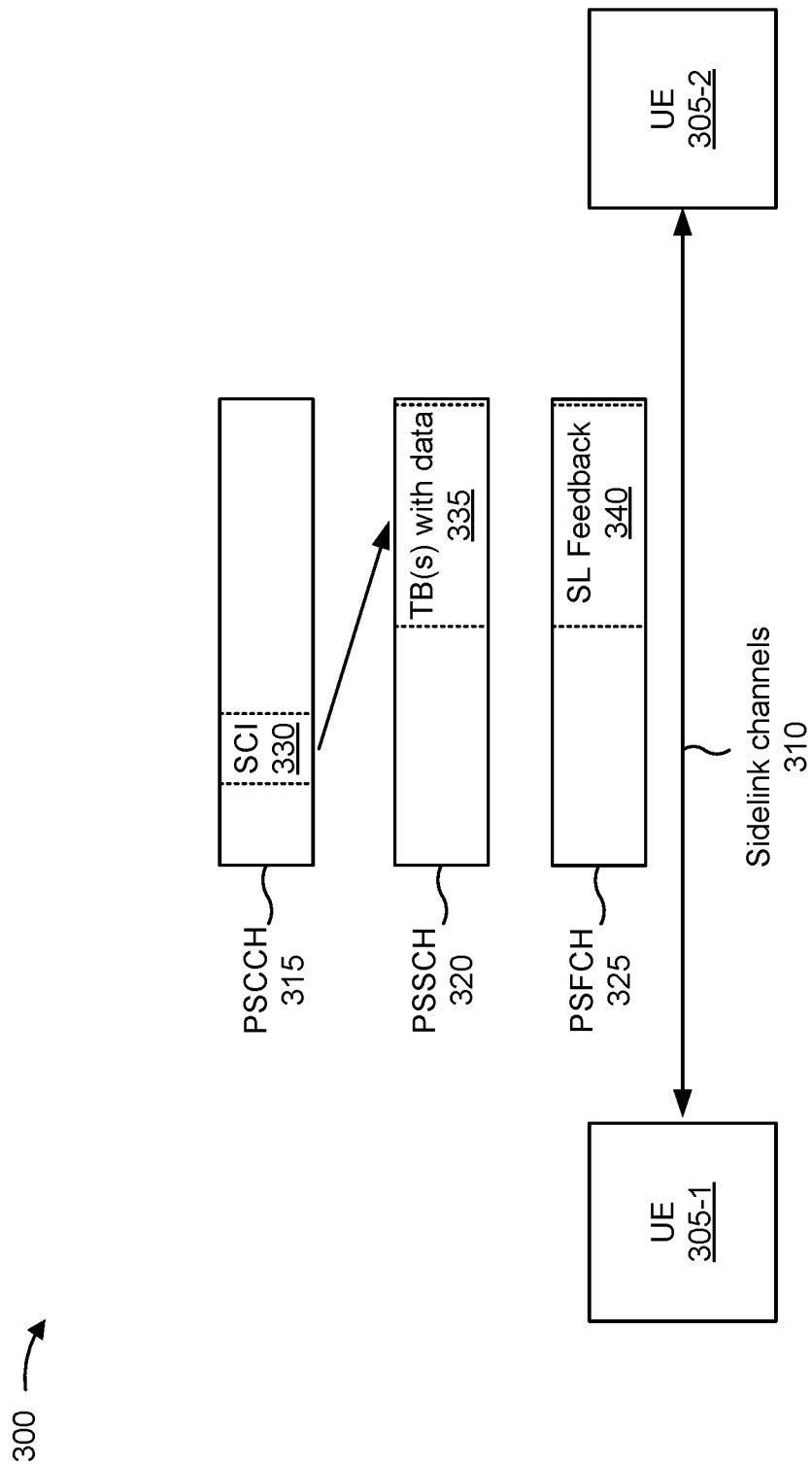
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink resource allocation mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a resource allocation mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the resource allocation mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
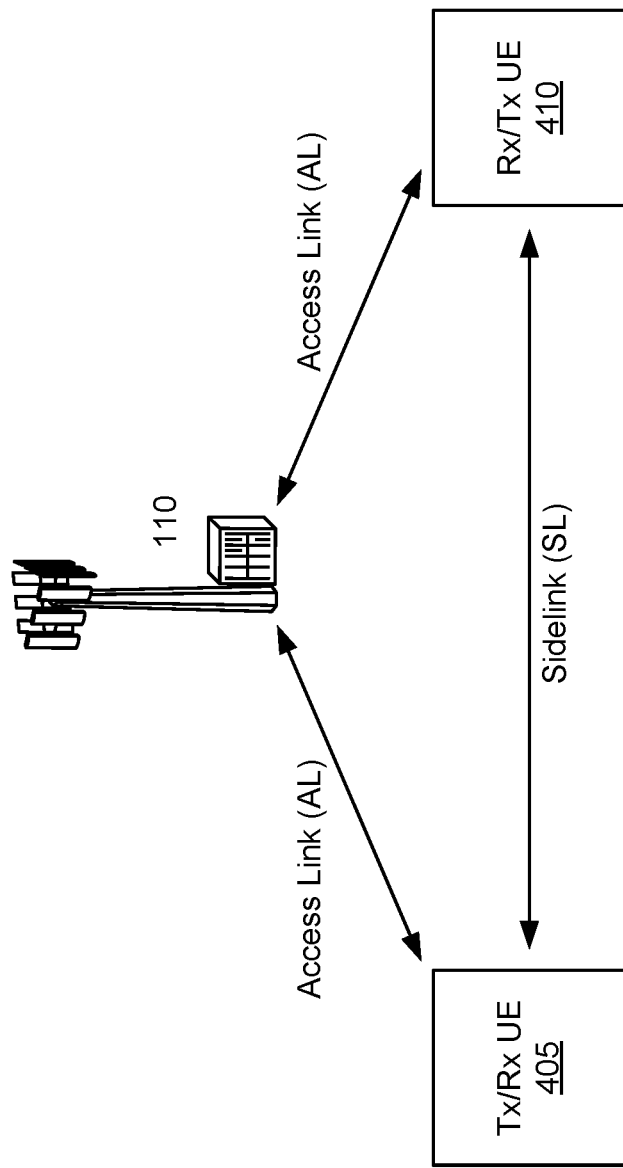
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
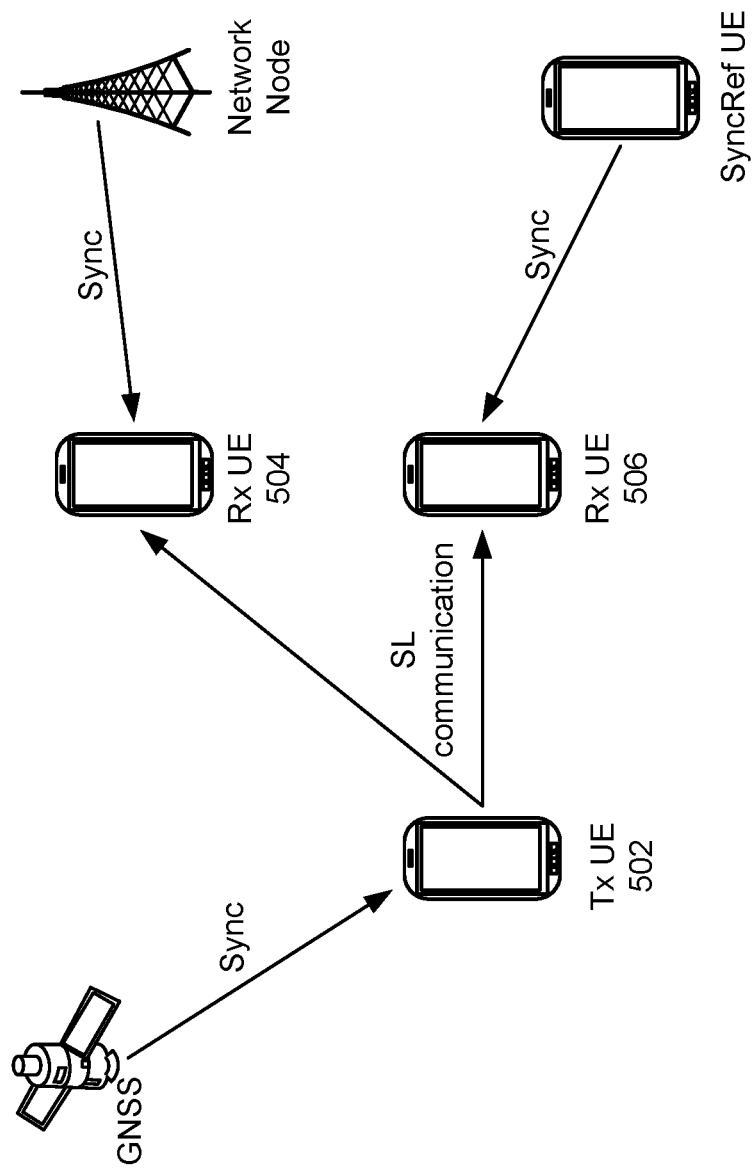
FIG. 5 is a diagram illustrating an example of sidelink synchronization, in accordance with the present disclosure.

FIG. 5 is a diagram illustrating an example 500 of sidelink synchronization, in accordance with the present disclosure.

In a typical cellular network, a UE may achieve time and frequency synchronization on an access link using periodic broadcasts (e.g., periodic synchronization signal block (SSB) transmissions) from a network node. In sidelink operation, one or more synchronization sources may transmit sidelink synchronization information to establish a reference time, indicate symbol timing, indicate frame timing, and/or otherwise transmit information to ensure that nearby UEs engaged in sidelink communication have the same timing reference. Sidelink synchronization procedures and sidelink communication procedures may be decoupled, which differs from access link communication. For example, in some cases, a UE may transmit sidelink synchronization signals, even though the UE is not a Tx UE involved in sidelink transmissions to an Rx UE. In some cases, a UE may not transmit sidelink synchronization signals, even though the UE is a Tx UE involved in sidelink transmission to an Rx UE. In some cases, an Rx UE communicating with a Tx UE via sidelink communications may perform sidelink synchronization (e.g., time and/or frequency synchronization) based on a sidelink synchronization signal transmitted by a sidelink synchronization source other than the Tx UE.

In some examples, the synchronization sources available to a UE for sidelink synchronization may include a GNSS, a network node (e.g., a gNB or an eNB), synchronization reference UEs (SyncRef UEs), and an internal clock of the UE. As shown in FIG. 5, a Tx UE 502 may transmit sidelink communications to a first Rx UE 504 and a second Rx UE 506. A GNSS may be the sidelink synchronization source for the Tx UE 502. For example, the Tx UE 502 may perform sidelink synchronization based at least in part on a GNSS signal transmitted by the GNSS. In this case, the Tx UE 502 may synchronize to GNSS timing based at least in part on the GNSS signal. A network node (e.g., a gNB or an eNB) may be the sidelink synchronization source for the first Rx UE 504. For example, the first Rx UE 504 may perform sidelink synchronization based at least in part on an SSB transmitted by the network node. A SyncRef UE may be the sidelink synchronization source for the second Rx UE 506. For example, the second Rx UE 506 may perform sidelink synchronization based at least in part on a sidelink SSB (S-SSB) transmitted by the SyncRef UE. A SyncRef UE may be any UE (e.g., UE 120) that transmits sidelink synchronization signals (e.g., in S-SSBs).

In some examples, an S-SSB may occupy one slot and use the same numerology as configured in a sidelink bandwidth part (BWP) (e.g., the same numerology as a PSCCH and/or PSSCH). For example, an S-SSB generally may include 11 RBs over 13 symbols in a slot, where a physical sidelink broadcast channel (PSBCH) is transmitted in the first symbol and the sixth through thirteenth symbols, a sidelink PSS (S-PSS) is transmitted in the second and third symbols, and a sidelink SSS (S-SSS) is transmitted in the fourth and fifth symbols. In this case, the S-PSS and S-SSS may occupy 127 subcarriers and use the same sequences as a PSS and SSS used for an access link SSB, and the PSBCH/DMRS may occupy 132 subcarriers. In a sidelink SSB configuration, the last (fourteenth) symbol may be reserved as a gap symbol or a guard symbol for transmission/reception retuning due to the sidelink being configured as a time division duplexing (TDD) band. The S-PSS and S-SSS may be jointly referred to as a sidelink synchronization signal (SLSS), which may be used for time and frequency synchronization among nearby UEs. For example, nearby UEs may include UEs that are in sidelink communication with each other, UEs that are within a threshold proximity of each other, and/or UEs that are within a communication range of each other, among other examples.

As indicated above, FIG. 5 is provided as an example. Other examples may differ from what is described with respect to FIG. 5.

Figure 6:
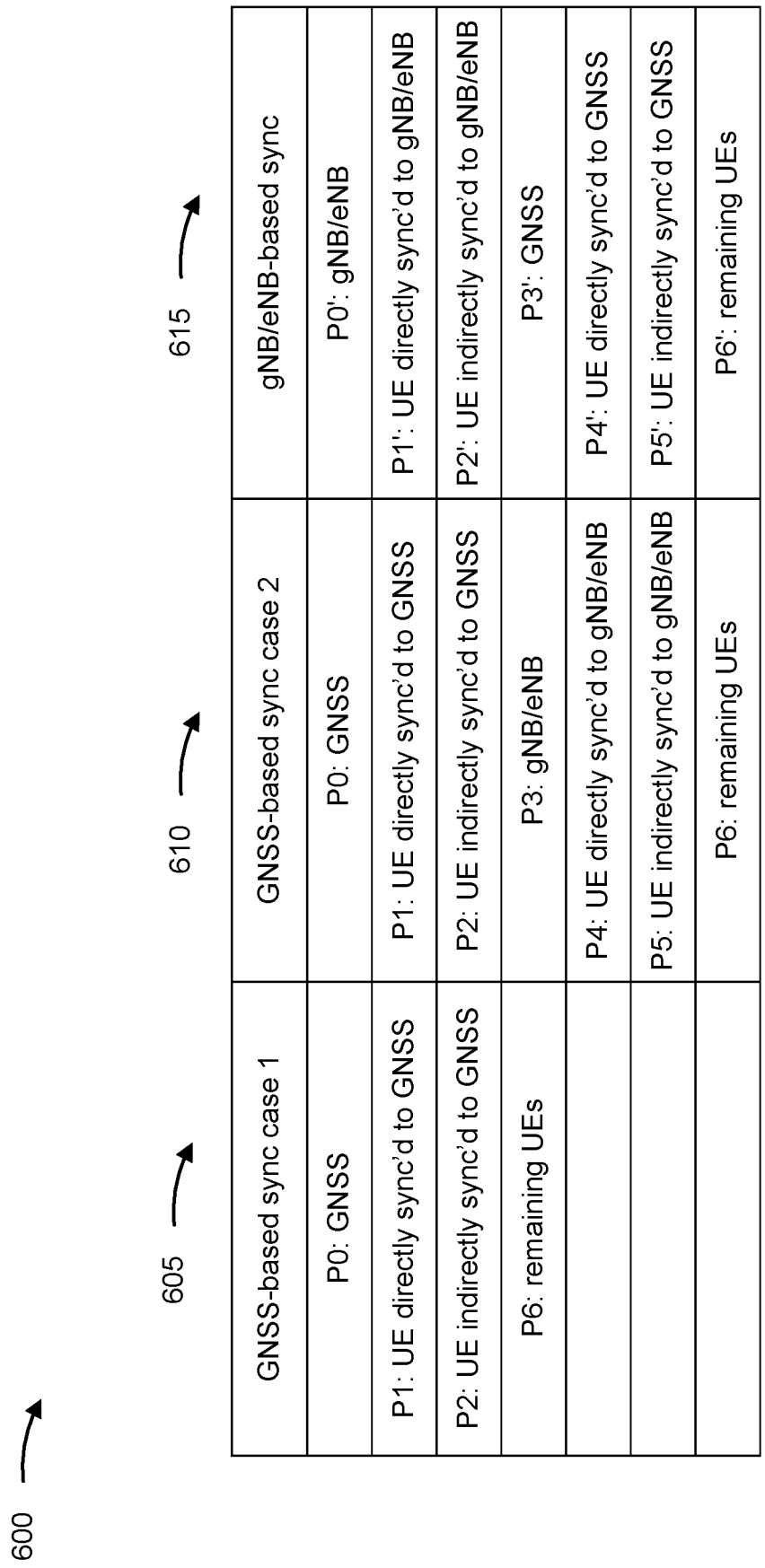
FIG. 6 is a diagram illustrating an example of priority rules for sidelink synchronization, in accordance with the present disclosure.

FIG. 6 is a diagram illustrating an example 600 of priority rules for sidelink synchronization, in accordance with the present disclosure.

A UE may select a sidelink synchronization source for sidelink synchronization based on a predefined priority rule that specifies a set of priorities for sidelink synchronization sources. For example, the predefined priority rule may be configured (e.g., via a configuration received from a network node) or pre-configured for a UE. FIG. 6 shows three example priority rules, including a first GNSS-based synchronization priority rule (GNSS-based sync case 1), a second GNSS-based synchronization priority rule (GNSS-based sync case 2), and a network-node-based synchronization priority rule (gNB/eNB-based sync).

As shown by reference number 605, the first GNSS-based synchronization priority rule (GNSS-based sync case 1) defines a synchronization hierarchy in which a GNSS signal has a highest priority (e.g., priority P0), whereby a UE synchronizes to GNSS timing whenever the GNSS signal is available. In cases in which the GNSS signal is unavailable, the UE searches for and synchronizes to S-SSBs from synchronization sources based on a descending priority, where a UE directly synchronized to a GNSS signal has a second highest priority (e.g., priority P1), a UE indirectly synchronized to a GNSS signal has a next highest priority (e.g., priority P2), and remaining UEs have a lowest priority (e.g., priority P6).

As shown by reference number 610, the second GNSS-based synchronization priority rule (GNSS-based sync case 2) defines a synchronization hierarchy in which a GNSS signal has a highest priority (e.g., priority P0), whereby a UE synchronizes to GNSS timing whenever the GNSS signal is available. In cases in which the GNSS signal is unavailable, the UE searches for and synchronizes to synchronization signals (e.g., S-SSBs or SSBs) from synchronization sources based on a descending priority, where a UE directly synchronized to a GNSS signal has a second highest priority (e.g., priority P1), a UE indirectly synchronized to a GNSS signal has a next highest priority (e.g., priority P2), a network node (e.g., a gNB or an eNB) has a next highest priority (e.g., priority P3), a UE directly synchronized to a network node has a next highest priority (e.g., priority P4), a UE indirectly synchronized to a network node has a next highest priority (e.g., priority P5), and remaining UEs have a lowest priority (e.g., priority P6).

As shown by reference number 615, the network-node-based synchronization priority rule (gNB/eNB-based sync) defines a synchronization hierarchy in which a network node (e.g., a gNB or an eNB) has a highest priority (e.g., priority P0'), whereby a UE performs sidelink synchronization based on an SSB transmitted by a network node whenever available. In cases in which the SSB transmitted by the network node is unavailable, the UE searches for and synchronizes to synchronization signals (e.g., S-SSBs or GNSS signals) from synchronization sources based on a descending priority, where a UE directly synchronized to a network node has a second highest priority (e.g., priority P1'), a UE indirectly synchronized to a network node has a next highest priority (e.g., priority P2'), a GNSS has a next highest priority (e.g., priority P3'), a UE directly synchronized to a GNSS signal has a next highest priority (e.g., priority P4'), a UE indirectly synchronized to a GNSS signal has a next highest priority (e.g., priority P5'), and remaining UEs have a lowest priority (e.g., priority P6').

A UE may transmit S-SSBs if the UE receives S-SSBs from another UE whose timing reference is derived from a node (e.g., a UE, a network node, or a GNSS transmitter) with a lower priority than the UE in accordance with the priority rule configured (or pre-configured) for the UE. In some examples, if a UE cannot receive any SSBs, S-SSBs, or GNSS signals, the UE may transmit S-SSBs with a local clock of the UE as the synchronization source. When S-SSBs are received by a UE, the priority of the S-SSBs may be identified by the associated synchronization signal identifiers (SSIDs) and the content of the PSBCH (e.g., an in-coverage indicator field included in the PSBCH).

As indicated above, FIG. 6 is provided as an example. Other examples may differ from what is described with respect to FIG. 6.

Figure 7:
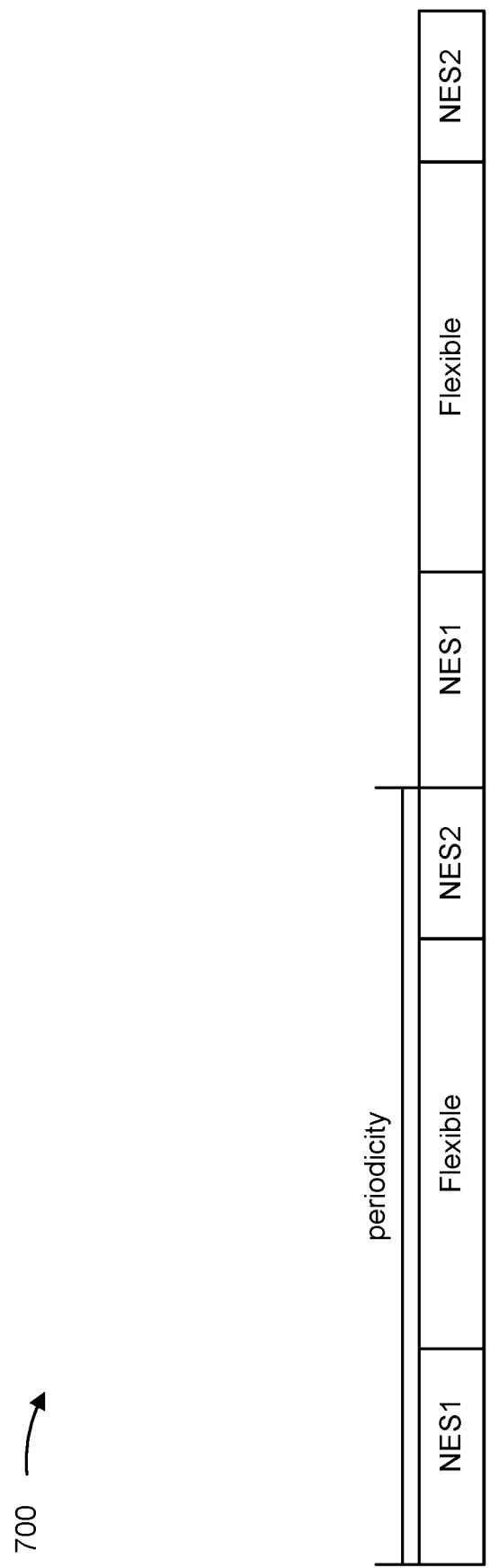
FIG. 7 is a diagram illustrating an example of network energy saving (NES) modes, in accordance with the present disclosure.

FIG. 7 is a diagram illustrating an example 700 of NES modes, in accordance with the present disclosure.

In some examples, a network node may be configured to operate in different NES modes (also referred to as "NES states") over time, where each NES mode may use one or more techniques to adapt transmission and/or reception in time, frequency, spatial, and/or power domains. For example, the NES modes may include a normal operation mode (which may also be referred to as a legacy mode or a default mode) and one or more NES modes that may be associated with a lower power consumption than the normal operation mode. As shown in FIG. 7, a network node may configure a semi-static pattern for switching between different NES modes to achieve network energy savings. For example, the semi-static pattern may be configured via RRC signaling. The semi-static pattern may include a sequence of NES modes that the network node follows with a given periodicity. For example, as shown in FIG. 7, in accordance with the semi-static pattern, the network node may operate in a first NES mode (NES1) for a first time period, the network node may then operate in a flexible mode for a second time period, and the network node may then operate in a second NES mode (NES2) for a third time period. The configured pattern for switching NES modes is repeated with the periodicity.

In FIG. 7, NES1 and NES2 may be different NES modes for the network node. In some examples, one NES mode (e.g., NES1) may be the normal operation mode, and the other NES mode (e.g., NES2) may be an NES mode associated with at least one operation that reduced network energy consumption, as compared to the normal operation mode. In some examples, NES1 may be a mode of operation in which the network node serves UEs with a first number (e.g., 64) of antenna ports, and NES2 may be a mode of operation in which the network node serves UEs with a second number (e.g., 32) of antenna ports. In some examples, NES1 may be a first sleep mode (e.g., a light sleep mode), and NES2 may be a second sleep mode (e.g., a deep sleep mode). In some examples, NES1 may be a downlink-only operation mode, and NES2 may be a downlink and uplink operation mode. In some examples, the semi-static pattern that schedules switching between NES modes may include more than two NES modes. For example, the network node may define and configure the UE with any number of different NES modes. The flexible mode may be a mode in which the network node may operate in accordance with any suitable NES mode (for example, depending on current traffic conditions), and the NES mode that the network node selects for the flexible mode may be dynamically indicated to UEs served by the network node. For example, depending on the current traffic conditions, the network node may dynamically indicate, to the UEs, that the network node will operate in NES1, NES2, or any other configured NES mode during the time duration associated with the flexible mode. Although example 700 shows a semi-static pattern that includes the flexible mode, in some other examples, the semi-static pattern may not include the flexible mode. In this case, the semi-static pattern may configure switching between NES1, NES2, and/or one or more other NES modes.

The scheduling of a given NES mode (e.g., via the semi-static pattern and/or a dynamic indication for the flexible mode) may depend on expected traffic (e.g., downlink and/or uplink traffic) for the network node. For example, for a time period in which a smaller amount of traffic is expected, the network node may operate in an NES mode that uses a smaller number of antenna ports, while for a time period in which a larger amount of traffic is expected, the network node may operate in an NES mode that uses a larger number of antenna ports.

In some cases, characteristics associated with SSB transmission by a network node may change, depending on the NES mode in which the network node is operating, which may adversely affect UEs performing sidelink synchronization based on the SSBs transmitted by the network node. In some examples, the SSB transmit power may be reduced in an NES mode due to antenna adaption and/or power adaption by the network node (e.g., due to the number of antennas used for SSB transmission). In some examples, transmission of SSBs by the network node may be muted completely in an NES mode, for example to allow the network node to enter a deep sleep mode. In some examples, the network node may turn off certain antenna panels covering certain areas in an NES mode, which may prevent UEs in that area from maintaining synchronization for sidelink communications. Thus, a network node switching between NES modes may decrease the reliability of sidelink synchronization performed by UEs in a coverage area of the network node.

Some techniques and apparatuses described herein enable a UE to perform sidelink synchronization using sidelink synchronization rules that are based at least in part on an NES mode of a network node. In some aspects, the UE may receive a mapping indication that indicates a mapping between a plurality of network energy saving modes and a plurality of priority rules for sidelink synchronization. The UE may receive an NES mode indication that indicates scheduling for one or more NES modes for a network node. The UE may perform sidelink synchronization in accordance with a priority rule of the plurality of priority rules based at least in part on the scheduling for the one or more network energy saving modes and the mapping between the plurality of network energy saving modes and the plurality of priority rules. As a result, the UE may change priority rules for sidelink synchronization based at least in part on a change to the NES mode for the network node. For example, the priority rule may prioritize GNSS-based sidelink synchronization in an NES mode in which the SSB transmission power is reduced or SSBs are not transmitted by the network node. In this way, the reliability of sidelink synchronization performed by UEs may be increased, while reducing network power consumption in one or more NES modes.

As indicated above, FIG. 7 is provided as an example. Other examples may differ from what is described with respect to FIG. 7.

Figure 8:
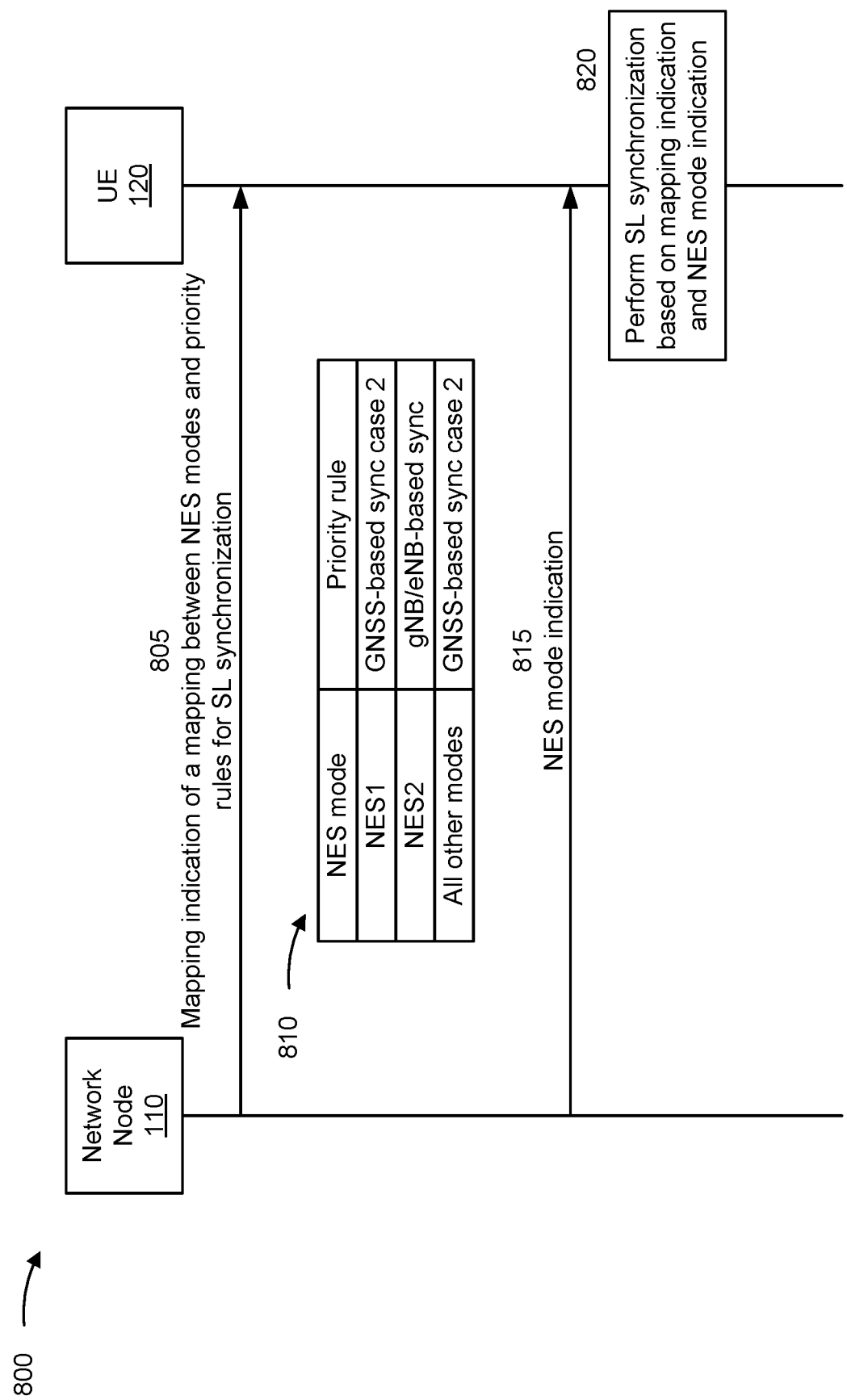
FIG. 8 is a diagram illustrating an example associated with sidelink synchronization based on an NES mode, in accordance with the present disclosure.

FIG. 8 is a diagram illustrating an example 800 associated with sidelink synchronization based on an NES mode, in accordance with the present disclosure. As shown in FIG. 8, example 800 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. In some aspects, the UE 120 may communicate with one or more other UEs via sidelink communications.

As shown in FIG. 8, and by reference number 805, the UE 120 may receive a mapping indication that indicates a mapping between a plurality of NES modes for the network node 110 and a plurality of priority rules for sidelink synchronization. In some aspects, as shown in FIG. 8, the network node 110 may transmit the mapping indication, and the UE 120 may receive the mapping indication from the network node 110. In some aspects, the mapping indication may be included in a system information block (SIB) broadcast by network node 110. For example, the mapping indication may be included in an SIB type #1 (SIB1) or an other SIB (OSIB). In this case, the UE 120 may receive the SIB that includes the mapping indication. In some aspects, the mapping indication may be RRC configured for the UE 120. For example, the network node 110 may transmit, and the UE 120 may receive, an RRC message that includes the mapping indication.

Although FIG. 8 shows the UE 120 receiving the mapping indication from the network node 110, in some other aspects, the UE 120 may receive the mapping indication from another UE (e.g., a sidelink UE) instead of from the network node 110. For example, the UE 120 may receive, from another UE (e.g., a sidelink UE), a sidelink communication that includes the mapping indication. For example, in a case in which the UE 120 is out of a coverage range of the network node 110, the UE 120 may receive the mapping indication from a sidelink UE that is in the coverage range of the network node 110. In some aspects, one or more sidelink UEs may broadcast (or share) the mapping indication via PSBCH communication, and the UE 120 may receive a PSBCH communication that includes the mapping indication. In some aspects, layer 1 (L1), layer 2 (L2), or layer 3 (L3) signaling between UEs may be used to transmit the mapping indication. For example, in a case in which L1 signaling is used, the mapping indication may be included in SCI (e.g., SCI-1 carried on PSCCH, SCI-2 carried on PSSCH, or a new SCI format), a dedicated PSSCH communication (e.g., in a dedicated PSSCH resource), or a sidelink wake-up signal (SL-WUS) transmitted from a sidelink UE to the UE 120. In a case in which L2 signaling is used, the mapping indication may be included in a PC5 medium access control (MAC) control element (MAC-CE) transmitted from a sidelink UE to the UE 120. In a case in which L3 signaling is used, the mapping indication may be included in a PC5 RRC message transmitted from a sidelink UE to the UE 120. In some aspects, the L1, L2, or L3 signaling including the mapping indication may be transmitted to the UE 120 on demand in connection with a request for the mapping indication (or a request for an NES mode indication and the mapping indication) transmitted by the UE 120 (e.g., via L1, L2, or L3 signaling) to a sidelink UE.

In some aspects, once the UE 120 receives the mapping indication (e.g., from the network node 110 or from a sidelink UE), the UE 120 may transmit a sidelink communication that includes the mapping indication. For example, the UE 120 may transmit the mapping indication in a sidelink communication to be received by one or more other UEs. In some aspects, the UE 120 may broadcast the mapping indication in a PSBCH communication. In some aspects, the UE 120 may transmit the mapping indication to another UE via L1 signaling (e.g., in SCI, a dedicated PSSCH communication, or an SL-WUS), L2 signaling (e.g., in a PC5 MAC-CE), or L3 signaling (e.g., in a PC5 RRC message). In this case, the UE 120 may transmit the mapping indication to the other UE based at least in part on receiving, from the other UE (e.g., via L1, L2, or L3 signaling), a request for the mapping indication (or a request for an NES mode indication and the mapping indication).

The mapping indication may indicate a mapping between a plurality of NES modes for the network node 110 and a plurality of priority rules for sidelink synchronization. Each priority rule, of the plurality of priority rules, may indicate priorities for a set of sidelink synchronization sources (e.g., GNSS, network node, UEs directly and indirectly synchronized with the GNSS or network node, and/or other UEs). For example, the plurality of priority rules may include the GNSS-based sync case 1 priority rule described in connection with FIG. 6, the GNSS-based sync case 2 priority rule described in connection with FIG. 6, the gNB/eNB-based sync priority rule described in connection with FIG. 6, and/or other priority rules for sidelink synchronization.

In some aspects, the mapping indication may indicate a mapping between a current NES mode of the network node 110 and a corresponding priority rule. As shown in FIG. 8, and by reference number 810, in an example mapping, a first NES mode (NES1) may map to the GNSS-based sync case 2 priority rule, a second NES mode (NES2) may map to the gNB/eNB-based sync priority rule, and all other NES modes may map to the GNSS-based sync case 2 priority rule. For example, in this case, NES1 may be an NES mode in which SSBs are not transmitted by the network node 110 or the SSB transmission power is reduced as compared with NES2.

In some aspects, the mapping indication may indicate a mapping for determining the priority rule based at least in part on a current NES mode and one or more future NES modes of the network node 110. That is, the UE 120 may determine the priority rule, in accordance with the mapping indication, as a function of the current NES mode and one or more future NES modes of the network node 110. In this case, the dependence on the future NES modes may be limited to a time window. For example, the mapping indication may indicate the priority rules as a function of the current NES mode and one or more future NES modes within a time window (e.g., from a current time at which the UE 120 is determining the priority rule). For example, the mapping indication may indicate for the UE 120 to use the gNB/eNB-based sync priority rule if the current NES mode is NES1 and all future NES modes during the next 1 second time window are either NES1 or the normal operation mode, and to otherwise use the GNSS-based sync case 2 priority rule.

As further shown in FIG. 8, and by reference number 815, the UE 120 may receive an NES mode indication. The NES mode indication may indicate scheduling for one or more NES modes of the network node 110. As shown in FIG. 8, in some aspects, the network node 110 may transmit the NES mode indication, and the UE 120 may receive the NES mode indication transmitted by the network node 110. In some aspects, the NES mode indication may indicate a configuration of a pattern (e.g., a semi-static pattern) for switching between multiple NES modes. For example, the NES mode indication may be an indication of a pattern for switching between multiple NES modes included in an RRC message transmitted from the network node 110 to the UE 120. In some aspects, the NES mode indication may be a dynamic indication of a switch to an NES mode. In this case, the dynamic indication of the switch to the NES mode may be included in DCI or a MAC-CE transmitted from the network node 110 to the UE 120. For example, the dynamic indication may indicate an NES mode to be used for a flexible mode in the configured pattern for switching between multiple NES modes.

Although FIG. 8 shows the UE 120 receiving the NES mode indication from the network node 110, in some other aspects, the UE 120 may receive the NES mode indication from another UE (e.g., a sidelink UE). In some aspects, a sidelink UE may broadcast the NES mode indication in a PSBCH communication. In some aspects, a sidelink UE may transmit the NES mode indication to the UE 120 via L1 signaling (e.g., in SCI (SCI-1, SCI-2, or a new SCI format), a dedicated PSSCH communication, or an SL-WUS), L2 signaling (e.g., in a PC5 MAC-CE), or L3 signaling (e.g., in a PC5 RRC message). In this case, the sidelink UE may transmit the NES mode indication to the UE 120 based at least in part on the UE 120 transmitting (e.g., via L1, L2, or L3 signaling) a request for the NES mode indication (or a request for the NES mode indication and the mapping indication) to the sidelink UE.

In some aspects, once the UE 120 receives the NES mode indication (e.g., from the network node 110 or a sidelink UE), the UE 120 may transmit the NES mode indication in a sidelink communication to be received by one or more other UEs. In some aspects, the UE 120 may broadcast the NES mode indication in a PSBCH communication. In some aspects, the UE 120 may transmit the NES mode indication to another UE via L1 signaling (e.g., in SCI, a dedicated PSSCH communication, or an SL-WUS), L2 signaling (e.g., in a PC5 MAC-CE), or L3 signaling (e.g., in a PC5 RRC message). In this case, the UE 120 may transmit the NES mode indication to the other UE based at least in part on receiving, from the other UE (e.g., via L1, L2, or L3 signaling), a request for the NES mode indication (or a request for an NES mode indication and the mapping indication).

As further shown in FIG. 8, and by reference number 820, the UE 120 may perform sidelink synchronization based at least in part on the mapping indication and the NES mode indication. In some aspects, the UE 120 may perform sidelink synchronization in accordance with a priority rule for sidelink synchronization based at least in part on the scheduling for the one or more NES modes indicated by the NES mode indication and the mapping between the plurality of NES modes and the plurality of priority rules for sidelink synchronization indicated by the mapping indication. For example, the UE 120 may use the mapping between the plurality of NES modes and the plurality of priority rules to determine which priority rule, of the plurality of priority rules, to apply for sidelink synchronization based at least in part on the indicated scheduling for the one or more NES modes.

In some aspects, the UE 120 may determine the priority rule based on a current NES mode for the network node 110, as indicated by the NES mode indication. For example, the UE 120 may determine the current NES mode from a configured pattern (e.g., a semi-static pattern) for NES mode switching and/or a dynamic indication of an NES mode. In this case, based at least in part on the mapping between the plurality of NES modes and the plurality of priority rules, the UE 120 may determine the priority rule, of the plurality of priority rules, that corresponds to the current NES mode of the network node 110.

In some aspects, the UE 120 may determine the priority rule based at least in part on the current NES mode and one or more future NES modes. For example, the UE 120 may determine the priority rule based at least in part on the current NES mode at a current time and one or more future NES modes scheduled in a time window (e.g., 1 second) from the current time. The UE 120 may determine the current NES mode and the one or more NES modes scheduled in the time window from the configured pattern (e.g., a semi-static pattern) for NES mode switching and/or a dynamic indication of an NES mode (e.g., for a configured flexible mode). In this case, based at least in part on the mapping between the plurality of NES modes and the plurality of priority rules, the UE 120 may determine the priority rule, of the plurality of priority rules, to be applied in connection with the current NES mode and the one or more future NES modes within the time window.

The priority rule determined by the UE 120 may indicate priorities for a set of sidelink synchronization sources, and the UE 120 may select a sidelink synchronization source in accordance with the priorities for the set of sidelink sources indicated by the priority rule. For example, the priority rule may be the GNSS-based sync case 1 priority rule, the GNSS-based sync case 2 priority rule, or the gNB/eNB-based sync priority rule, among other examples. As described above in connection with FIG. 6, in a case in which the priority rule is the GNSS-based sync case 1 priority rule, the UE 120 may prioritize, as the sidelink synchronization source, a GNSS signal, then a UE directly synchronized to a GNSS signal, then a UE indirectly synchronized to a GNSS signal, and then remaining UEs. As described above in connection with FIG. 6, in a case in which the priority rule is the GNSS-based sync case 2 priority rule, the UE 120 may prioritize, as the sidelink synchronization source, a GNSS signal, then a UE directly synchronized to a GNSS signal, then a UE indirectly synchronized to a GNSS signal, then a network node (e.g., the network node 110), then a UE directly synchronized to a network node, then a UE indirectly synchronized to a network node, and then remaining UEs. As described above in connection with FIG. 6, in a case in which the priority rule is the gNB/eNB priority rule, the UE 120 may prioritize, as the sidelink synchronization source, a network node (e.g., the network node 110), then a UE directly synchronized to a network node, then a UE indirectly synchronized to a network node, then a GNSS signal, then a UE directly synchronized to a GNSS signal, then a UE indirectly synchronized to a GNSS signal, and then remaining UEs.

The UE 120 may receive a synchronization signal from the selected sidelink synchronization source, and the UE 120 may perform sidelink synchronization (e.g., time and/or frequency synchronization) based at least in part on the synchronization signal. For example, in a case in which the sidelink synchronization source is a GNSS, the synchronization signal may be a GNSS signal. In a case in which the sidelink synchronization source is a network node (e.g., the network node 110), the synchronization signal may be (or may be included in) an SSB transmitted by the network node. In a case in which the sidelink synchronization source is another UE (e.g., a SyncRef UE), the synchronization signal may be (or may be included in) an S-SSB transmitted by the other UE.

Once the UE 120 performs sidelink synchronization, the UE 120 may perform sidelink communications with one or more other UEs. For example, the UE 120 may transmit one or more sidelink communications to one or more other UEs and/or receive one or more sidelink communications from one or more other UEs. In some aspects, once the UE 120 performs sidelink synchronization, the UE 120 may transmit a synchronization signal that may be used by one or more other UEs for sidelink synchronization. For example, the UE 120 may transmit an S-SSB based at least in part on the UE 120 receiving an S-SSB from another UE whose timing reference is derived from a node (e.g., a sidelink synchronization source) with a lower priority than the UE 120 in accordance with the priority rule determined by the UE 120.

In some aspects, the UE 120 may update the priority rule for sidelink synchronization based at least in part on a change in the NES mode of the network node 110, in accordance with the mapping between the NES modes and the priority rules. In some aspects, the UE 120 may be triggered to update the priority rule by an NES mode change notification. In this case, the UE 120 may receive (e.g., from the network node 110 or another UE) an NES mode change notification, and the UE 120 may switch from the one priority rule to another priority rule based at least in part on the NES mode change notification and the mapping between the plurality of NES modes and the plurality of priority rules. For example, the NES mode change notification may be a dynamic indication of a change from one NES mode to another NES mode. The UE 120, in connection with switching the priority rule, may perform sidelink synchronization based at least in part on a different sidelink synchronization source in accordance with the updated priority rule.

In some aspects, the priority rule determined by the UE 120 may be associated with a time window for validity of the priority rule. For example, each priority rule, of the plurality of priority rules indicated by the mapping indication, may be associated with a respective time window for validity, or all of the plurality of priority rules may be associated with the same time window for validity. In this case, the expiration of the time window for validity of the priority rule may trigger the UE 120 to update the priority rule (e.g., based at least in part on the mapping between the NES modes and the priority rules and the current and/or future scheduled NES modes for the network node 110). The UE 120, in connection with switching the priority rule, may perform sidelink synchronization based at least in part on a different sidelink synchronization source in accordance with the updated priority rule.

In some aspects, the UE 120 may be triggered to update the priority rule based at least in part on an indication from another UE 120 via L1 signaling (e.g., in SCI (SCI-1, SCI-2, or a new SCI format), a dedicated PSSCH communication, or an SL-WUS), L2 signaling (e.g., in a PC5 MAC-CE), or L3 signaling (e.g., in a PC5 RRC message). In some aspects, the UE 120 may be triggered to update the priority rule based at least in part on an updated mapping indication. For example, the UE 120 may receive an updated mapping indication that indicates an updated mapping between the plurality of network energy saving modes and the plurality of priority rules for sidelink synchronization, and the UE 120 may switch from one priority rule to another priority rule based at least in part on the updated mapping between the plurality of network energy saving modes and the plurality of priority rules for sidelink synchronization. In some aspects, the UE 120 may receive the updated mapping indication from the network node 110. In other aspects, the UE 120 may receive the updated mapping indication in a sidelink communication (e.g., via L1, L2, or L3 signaling) from another UE. For example, the updated mapping indication may be included in SCI (e.g., SCI-1 carried on PSCCH, SCI-2 carried on PSSCH, or a new SCI format), a dedicated PSSCH communication (e.g., in a dedicated PSSCH resource), an SL-WUS, a PC5 MAC-CE, or a PC5 RRC message.

As indicated above, FIG. 8 is provided as an example. Other examples may differ from what is described with respect to FIG. 8.

Figure 9:
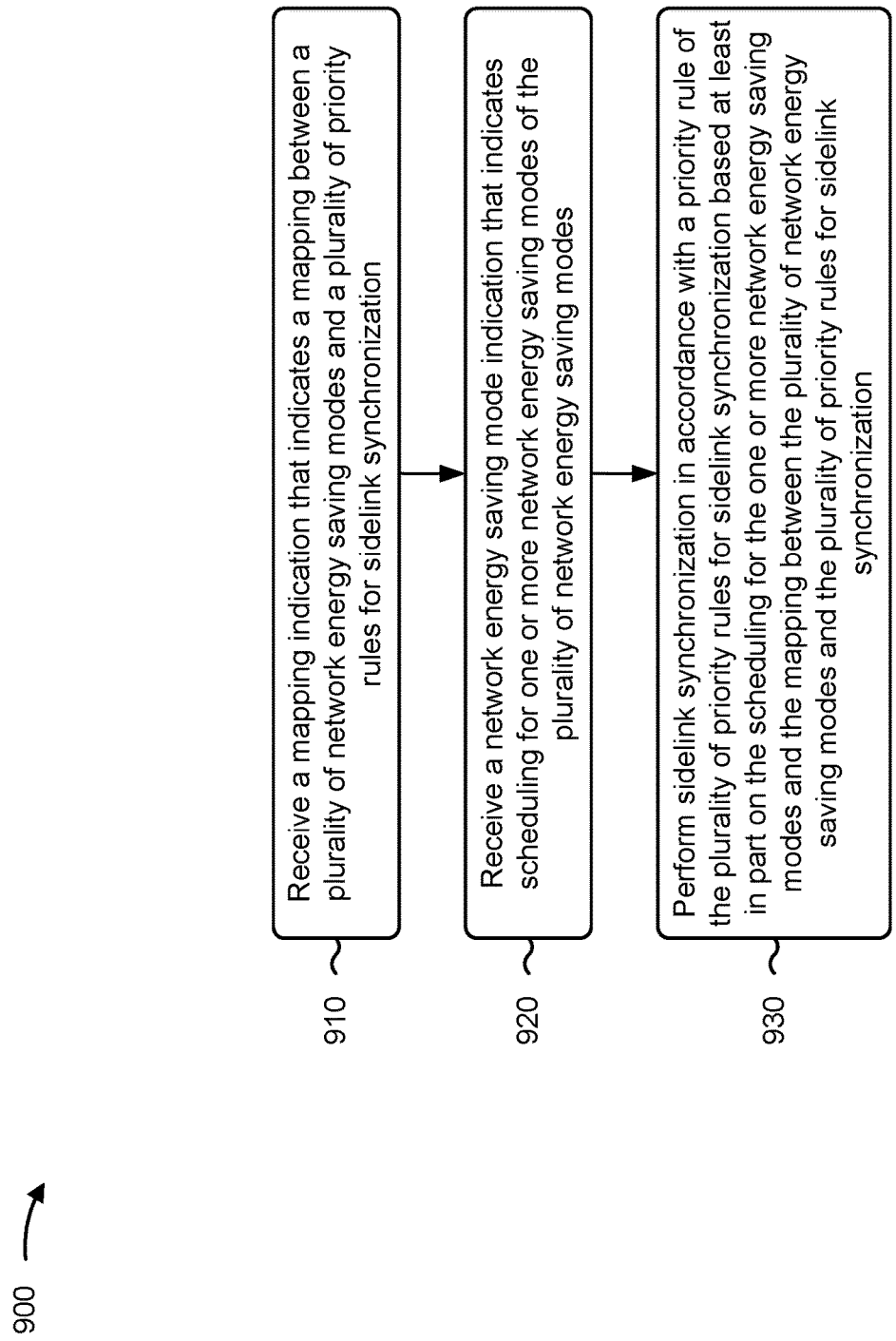
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with sidelink synchronization based on an NES mode.

As shown in FIG. 9, in some aspects, process 900 may include receiving a mapping indication that indicates a mapping between a plurality of network energy saving modes and a plurality of priority rules for sidelink synchronization (block 910). For example, the UE (e.g., using communication manager 140 and/or reception component 1102, depicted in FIG. 11) may receive a mapping indication that indicates a mapping between a plurality of network energy saving modes and a plurality of priority rules for sidelink synchronization, as described above.

As further shown in FIG. 9, in some aspects, process 900 may include receiving a network energy saving mode indication that indicates scheduling for one or more network energy saving modes of the plurality of network energy saving modes (block 920). For example, the UE (e.g., using communication manager 140 and/or reception component 1102, depicted in FIG. 11) may receive a network energy saving mode indication that indicates scheduling for one or more network energy saving modes of the plurality of network energy saving modes, as described above.

As further shown in FIG. 9, in some aspects, process 900 may include performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization (block 930). For example, the UE (e.g., using communication manager 140 and/or sidelink synchronization component 1108, depicted in FIG. 11) may perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization, as described above.

Process 900 may include additional aspects, such as any single aspect or any combination of aspects described below and/or in connection with one or more other processes described elsewhere herein.

In a first aspect, each priority rule, of the plurality of priority rules, indicates priorities for a set of sidelink synchronization sources, and performing sidelink synchronization in accordance with a priority rule of the plurality of priority rules includes performing sidelink synchronization based at least in part on a sidelink synchronization source, of the set of sidelink synchronization sources, in accordance with the priorities for the set of sidelink synchronization sources indicated by the priority rule.

In a second aspect, alone or in combination with the first aspect, receiving the mapping indication includes receiving, from a network node, an SIB that includes the mapping indication.

In a third aspect, alone or in combination with one or more of the first and second aspects, receiving the mapping indication includes receiving, from a network node, an RRC message that includes the mapping indication.

In a fourth aspect, alone or in combination with one or more of the first through third aspects, receiving the mapping indication includes receiving, from another UE, a sidelink communication that includes the mapping indication.

In a fifth aspect, alone or in combination with one or more of the first through fourth aspects, the mapping indication is included in SCI, a dedicated PSSCH communication, an SL-WUS, a PC5 MAC-CE, a PC5 RRC message, or a sidelink broadcast channel communication.

In a sixth aspect, alone or in combination with one or more of the first through fifth aspects, the priority rule, of the plurality of priority rules, is associated with a current network energy saving mode.

In a seventh aspect, alone or in combination with one or more of the first through sixth aspects, the priority rule, of the plurality of priority rules, is based at least in part on a current network energy saving mode and one or more future network energy saving modes indicated by the network energy saving mode indication.

In an eighth aspect, alone or in combination with one or more of the first through seventh aspects, the one or more future network energy saving modes include one or more future network energy saving modes scheduled in a time window from a current time.

In a ninth aspect, alone or in combination with one or more of the first through eighth aspects, process 900 includes receiving a network energy saving mode change notification, and switching from the priority rule, of the plurality of priority rules for sidelink synchronization, to another priority rule of the plurality of priority rules for sidelink synchronization based at least in part on the network energy saving mode change notification.

In a tenth aspect, alone or in combination with one or more of the first through ninth aspects, process 900 includes switching from the priority rule, of the plurality of priority rules for sidelink synchronization, to another priority rule of the plurality of priority rules for sidelink synchronization based at least in part on expiration of a time window for validity of the priority rule.

In an eleventh aspect, alone or in combination with one or more of the first through tenth aspects, process 900 includes receiving an updated mapping indication that indicates an updated mapping between the plurality of network energy saving modes and the plurality of priority rules for sidelink synchronization, and switching from the priority rule, of the plurality of priority rules for sidelink synchronization, to another priority rule of the plurality of priority rules for sidelink synchronization based at least in part on the updated mapping between the plurality of network energy saving modes and the plurality of priority rules for sidelink synchronization.

In a twelfth aspect, alone or in combination with one or more of the first through eleventh aspects, the updated mapping indication is included in SCI, a dedicated PSSCH communication, an SL-WUS, a PC5 MAC-CE, or a PC5 RRC message.

In a thirteenth aspect, alone or in combination with one or more of the first through twelfth aspects, process 900 includes transmitting a sidelink communication that includes the mapping indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
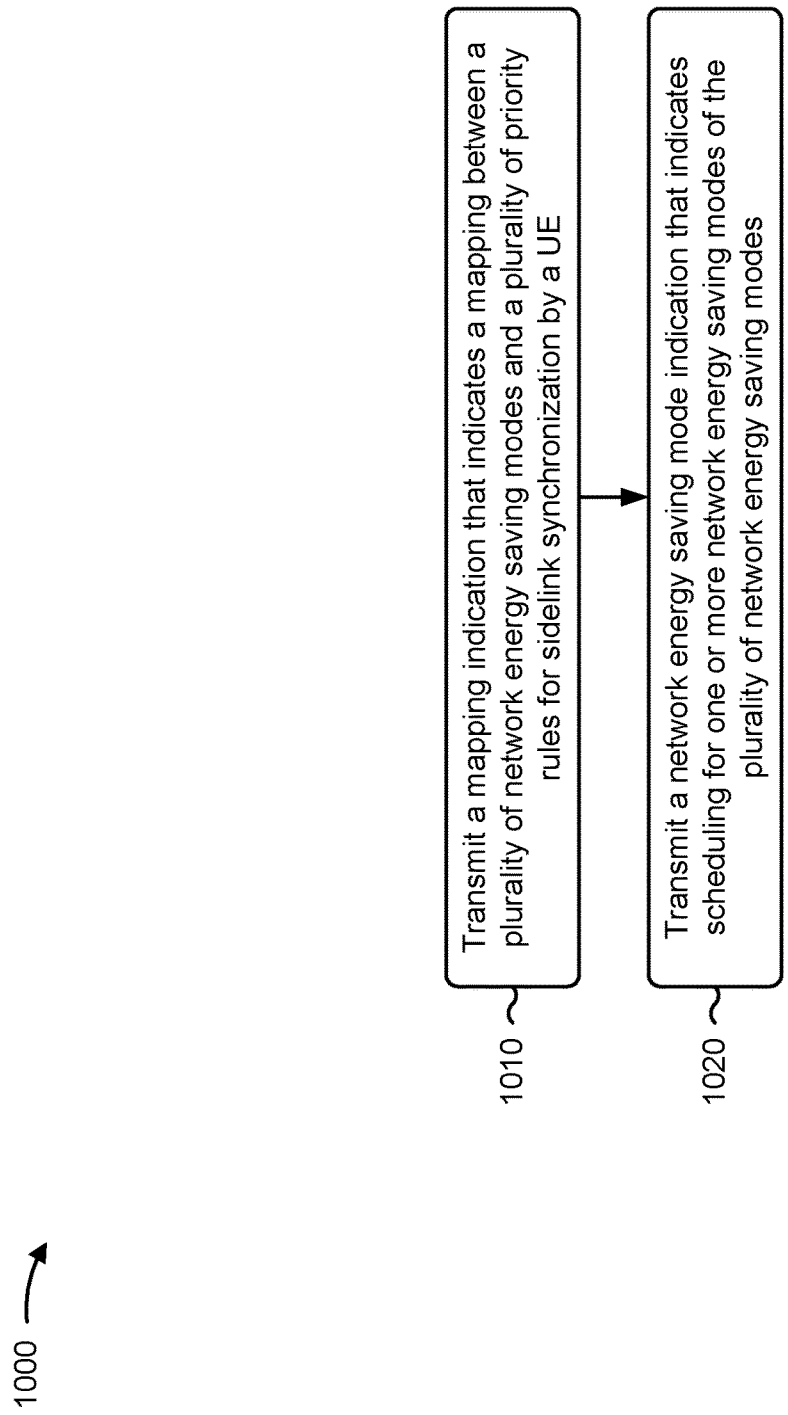
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with sidelink synchronization based on an NES mode.

As shown in FIG. 10, in some aspects, process 1000 may include transmitting a mapping indication that indicates a mapping between a plurality of network energy saving modes and a plurality of priority rules for sidelink synchronization by a UE (block 1010). For example, the network node (e.g., using communication manager 150 and/or transmission component 1204, depicted in FIG. 12) may transmit a mapping indication that indicates a mapping between a plurality of network energy saving modes and a plurality of priority rules for sidelink synchronization by a UE, as described above.

As further shown in FIG. 10, in some aspects, process 1000 may include transmitting a network energy saving mode indication that indicates scheduling for one or more network energy saving modes of the plurality of network energy saving modes (block 1020). For example, the network node (e.g., using communication manager 150 and/or transmission component 1204, depicted in FIG. 12) may transmit a network energy saving mode indication that indicates scheduling for one or more network energy saving modes of the plurality of network energy saving modes, as described above.

Process 1000 may include additional aspects, such as any single aspect or any combination of aspects described below and/or in connection with one or more other processes described elsewhere herein.

In a first aspect, each priority rule, of the plurality of priority rules, indicates priorities for a set of sidelink synchronization sources.

In a second aspect, alone or in combination with the first aspect, transmitting the mapping indication includes transmitting an SIB that includes the mapping indication.

In a third aspect, alone or in combination with one or more of the first and second aspects, transmitting the mapping indication includes transmitting an RRC message that includes the mapping indication.

In a fourth aspect, alone or in combination with one or more of the first through third aspects, process 1000 includes transmitting a network energy saving mode change notification.

In a fifth aspect, alone or in combination with one or more of the first through fourth aspects, process 1000 includes transmitting an updated mapping indication that indicates an updated mapping between the plurality of network energy saving modes and the plurality of priority rules for sidelink synchronization.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
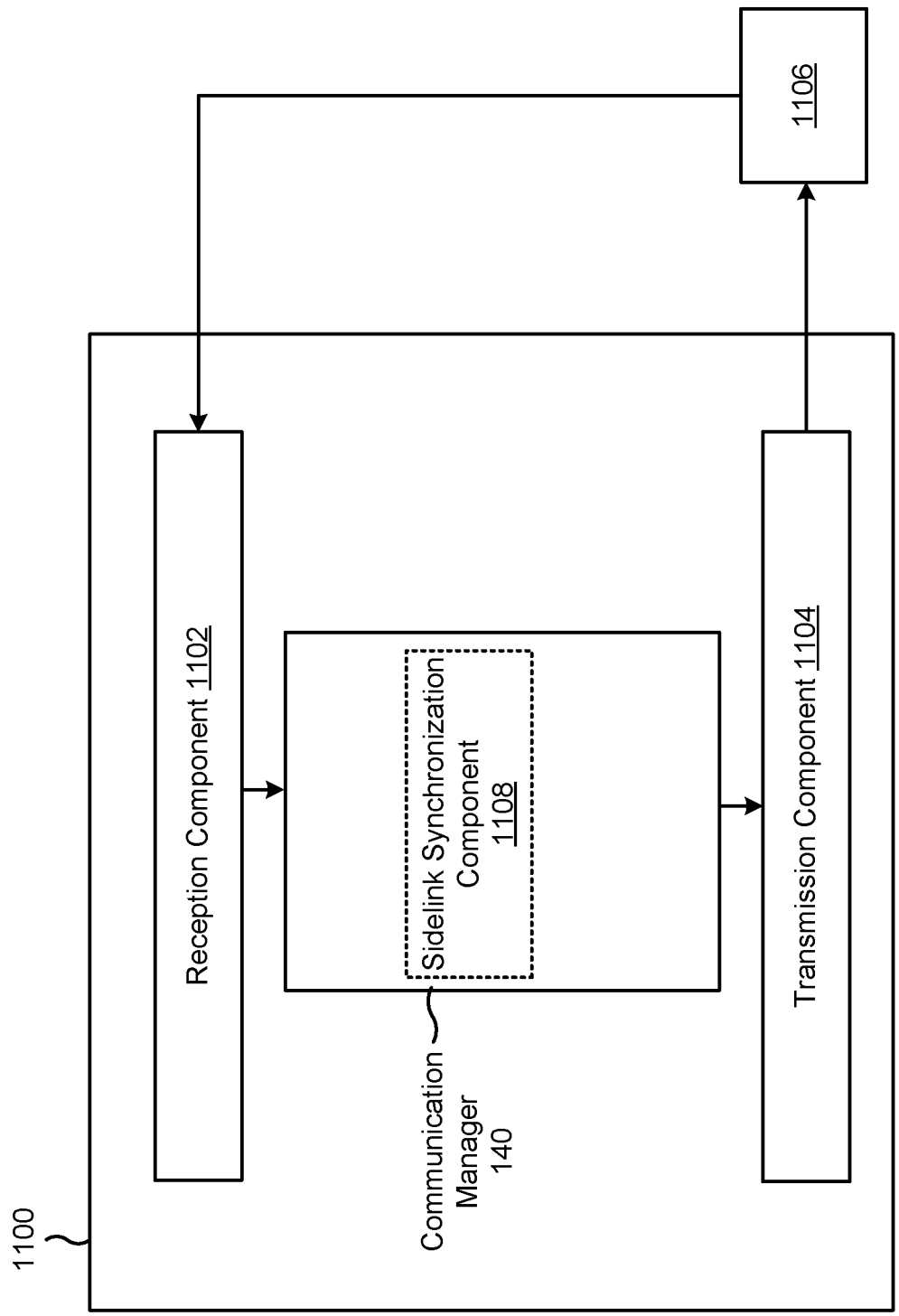
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a sidelink synchronization component 1108, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a mapping indication that indicates a mapping between a plurality of network energy saving modes and a plurality of priority rules for sidelink synchronization. The reception component 1102 may receive a network energy saving mode indication that indicates scheduling for one or more network energy saving modes of the plurality of network energy saving modes. The sidelink synchronization component 1108 may perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

The reception component 1102 may receive a network energy saving mode change notification.

The sidelink synchronization component 1108 may switch from the priority rule, of the plurality of priority rules for sidelink synchronization, to another priority rule of the plurality of priority rules for sidelink synchronization based at least in part on the network energy saving mode change notification.

The sidelink synchronization component 1108 may switch from the priority rule, of the plurality of priority rules for sidelink synchronization, to another priority rule of the plurality of priority rules for sidelink synchronization based at least in part on expiration of a time window for validity of the priority rule.

The reception component 1102 may receive an updated mapping indication that indicates an updated mapping between the plurality of network energy saving modes and the plurality of priority rules for sidelink synchronization.

The sidelink synchronization component 1108 may switch from the priority rule, of the plurality of priority rules for sidelink synchronization, to another priority rule of the plurality of priority rules for sidelink synchronization based at least in part on the updated mapping between the plurality of network energy saving modes and the plurality of priority rules for sidelink synchronization.

The transmission component 1104 may transmit a sidelink communication that includes the mapping indication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
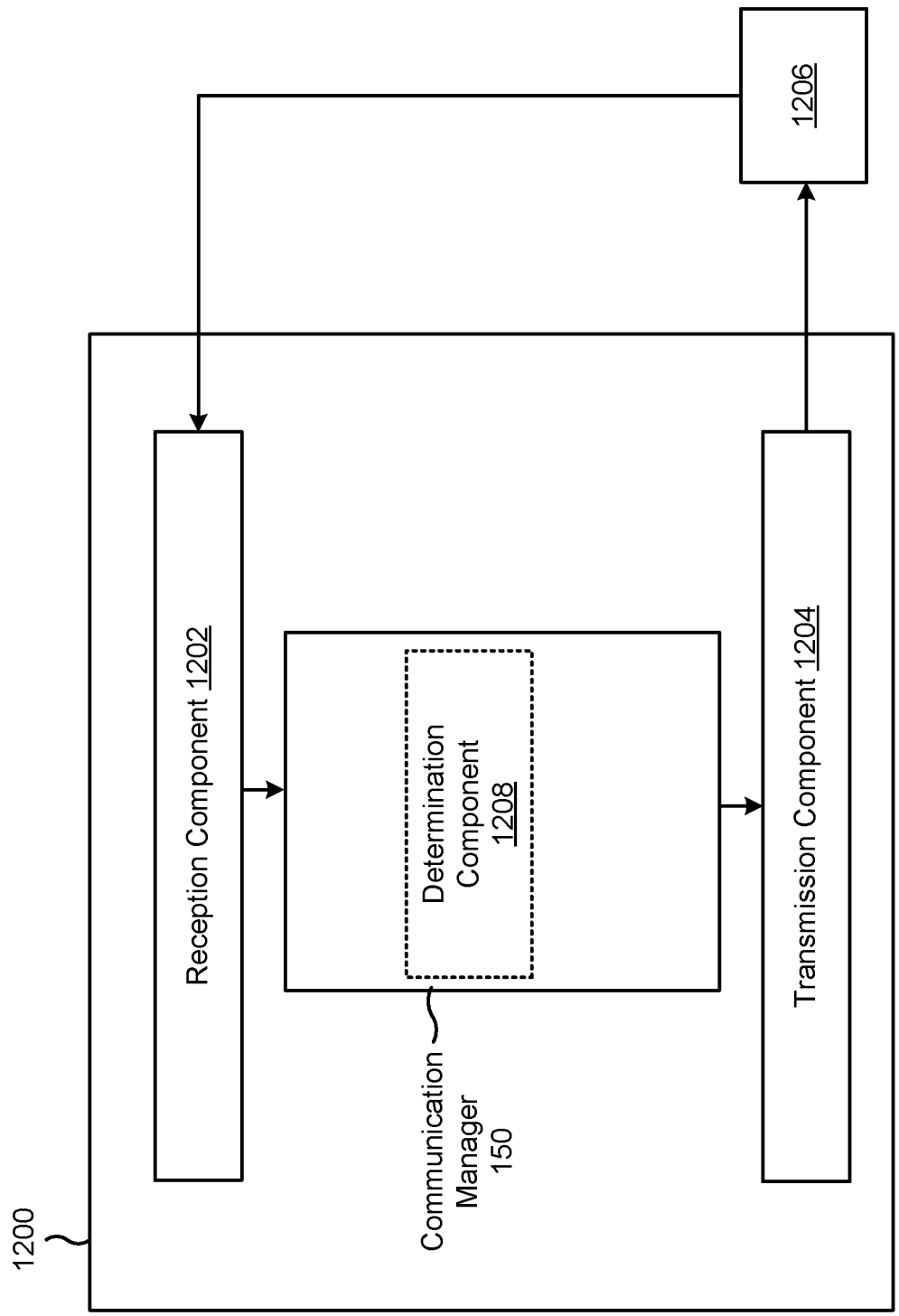

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit a mapping indication that indicates a mapping between a plurality of network energy saving modes and a plurality of priority rules for sidelink synchronization by a UE. The transmission component 1204 may transmit a network energy saving mode indication that indicates scheduling for one or more network energy saving modes of the plurality of network energy saving modes.

The determination component 1208 may determine the mapping between the plurality of network energy saving modes and the plurality of priority rules for sidelink synchronization.

The transmission component 1204 may transmit a network energy saving mode change notification.

The transmission component 1204 may transmit an updated mapping indication that indicates an updated mapping between the plurality of network energy saving modes and the plurality of priority rules for sidelink synchronization.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

- Aspect 1: A method of wireless communication performed by a user equipment (UE), comprising: receiving a mapping indication that indicates a mapping between a plurality of network energy saving modes and a plurality of priority rules for sidelink synchronization; receiving a network energy saving mode indication that indicates scheduling for one or more network energy saving modes of the plurality of network energy saving modes; and performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.
- Aspect 2: The method of Aspect 1, wherein each priority rule, of the plurality of priority rules, indicates priorities for a set of sidelink synchronization sources, and wherein performing sidelink synchronization in accordance with a priority rule of the plurality of priority rules comprises: performing sidelink synchronization based at least in part on a sidelink synchronization source, of the set of sidelink synchronization sources, in accordance with the priorities for the set of sidelink synchronization sources indicated by the priority rule.
- Aspect 3: The method of any of Aspects 1-2, wherein receiving the mapping indication comprises: receiving, from a network node, a system information block (SIB) that includes the mapping indication.
- Aspect 4: The method of any of Aspects 1-2, wherein receiving the mapping indication comprises: receiving, from a network node, a radio resource control (RRC) message that includes the mapping indication.
- Aspect 5: The method of any of Aspects 1-2, wherein receiving the mapping indication comprises: receiving, from another UE, a sidelink communication that includes the mapping indication.
- Aspect 6: The method of Aspect 5, wherein the mapping indication is included in sidelink control information (SCI), a dedicated physical sidelink control channel (PSSCH) communication, a sidelink wake-up signal (SL-WUS), a PC5 medium access control (MAC) control element (MAC-CE), a PC5 radio resource control (RRC) message, or a sidelink broadcast channel communication.
- Aspect 7: The method of any of Aspects 1-6, wherein the priority rule, of the plurality of priority rules, is associated with a current network energy saving mode.
- Aspect 8: The method of any of Aspects 1-7, wherein the priority rule, of the plurality of priority rules, is based at least in part on a current network energy saving mode and one or more future network energy saving modes indicated by the network energy saving mode indication.
- Aspect 9: The method of Aspect 8, wherein the one or more future network energy saving modes include one or more future network energy saving modes scheduled in a time window from a current time.
- Aspect 10: The method of any of Aspects 1-9, further comprising: receiving a network energy saving mode change notification; and switching from the priority rule, of the plurality of priority rules for sidelink synchronization, to another priority rule of the plurality of priority rules for sidelink synchronization based at least in part on the network energy saving mode change notification.
- Aspect 11: The method of any of Aspects 1-10, further comprising: switching from the priority rule, of the plurality of priority rules for sidelink synchronization, to another priority rule of the plurality of priority rules for sidelink synchronization based at least in part on expiration of a time window for validity of the priority rule.
- Aspect 12: The method of any of Aspects 1-11, further comprising: receiving an updated mapping indication that indicates an updated mapping between the plurality of network energy saving modes and the plurality of priority rules for sidelink synchronization; and switching from the priority rule, of the plurality of priority rules for sidelink synchronization, to another priority rule of the plurality of priority rules for sidelink synchronization based at least in part on the updated mapping between the plurality of network energy saving modes and the plurality of priority rules for sidelink synchronization.
- Aspect 13: The method of Aspect 12, wherein the updated mapping indication is included in sidelink control information (SCI), a dedicated physical sidelink control channel (PSSCH) communication, a sidelink wake-up signal (SL-WUS), a PC5 medium access control (MAC) control element (MAC-CE), or a PC5 radio resource control (RRC) message.
- Aspect 14: The method of any of Aspects 1-13, further comprising: transmitting a sidelink communication that includes the mapping indication.
- Aspect 15: A method of wireless communication performed by a network node, comprising: transmitting a mapping indication that indicates a mapping between a plurality of network energy saving modes and a plurality of priority rules for sidelink synchronization by a user equipment (UE); and transmitting a network energy saving mode indication that indicates scheduling for one or more network energy saving modes of the plurality of network energy saving modes.

Aspect 16: The method of Aspect 15, wherein each priority rule, of the plurality of priority rules, indicates priorities for a set of sidelink synchronization sources.

Aspect 17: The method of any of Aspects 15-16, wherein transmitting the mapping indication comprises: transmitting a system information block (SIB) that includes the mapping indication.

Aspect 18: The method of any of Aspects 15-16, wherein transmitting the mapping indication comprises: transmitting a radio resource control (RRC) message that includes the mapping indication.

Aspect 19: The method of any of Aspects 15-18, further comprising: transmitting a network energy saving mode change notification.

Aspect 20: The method of any of Aspects 15-19, further comprising: transmitting an updated mapping indication that indicates an updated mapping between the plurality of network energy saving modes and the plurality of priority rules for sidelink synchronization.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a mapping indication that indicates a mapping between a plurality of network energy saving modes and a plurality of priority rules for sidelink synchronization;
      receive a network energy saving mode indication that indicates scheduling for one or more network energy saving modes of the plurality of network energy saving modes; and
      perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

2. The UE of claim 1, wherein each priority rule, of the plurality of priority rules, indicates priorities for a set of sidelink synchronization sources, and wherein the one or more processors, to perform sidelink synchronization in accordance with a priority rule of the plurality of priority rules, are configured to:
perform sidelink synchronization based at least in part on a sidelink synchronization source, of the set of sidelink synchronization sources, in accordance with the priorities for the set of sidelink synchronization sources indicated by the priority rule.

3. The UE of claim 1, wherein the one or more processors, to receive the mapping indication, are configured to:
receive, from a network node, a system information block (SIB) that includes the mapping indication.

4. The UE of claim 1, wherein the one or more processors, to receive the mapping indication, are configured to:
receive, from a network node, a radio resource control (RRC) message that includes the mapping indication.

5. The UE of claim 1, wherein the one or more processors, to receive the mapping indication, are configured to:
receive, from another UE, a sidelink communication that includes the mapping indication.

6. The UE of claim 5, wherein the mapping indication is included in sidelink control information (SCI), a dedicated physical sidelink control channel (PSSCH) communication, a sidelink wake-up signal (SL-WUS), a PC5 medium access control (MAC) control element (MAC-CE), a PC5 radio resource control (RRC) message, or a sidelink broadcast channel communication.

7. The UE of claim 1, wherein the priority rule, of the plurality of priority rules, is associated with a current network energy saving mode.

8. The UE of claim 1, wherein the priority rule, of the plurality of priority rules, is based at least in part on a current network energy saving mode and one or more future network energy saving modes indicated by the network energy saving mode indication.

9. The UE of claim 8, wherein the one or more future network energy saving modes include one or more future network energy saving modes scheduled in a time window from a current time.

10. The UE of claim 1, wherein the one or more processors are further configured to:
receive a network energy saving mode change notification; and
switch from the priority rule, of the plurality of priority rules for sidelink synchronization, to another priority rule of the plurality of priority rules for sidelink synchronization based at least in part on the network energy saving mode change notification.

11. The UE of claim 1, wherein the one or more processors are further configured to:
switch from the priority rule, of the plurality of priority rules for sidelink synchronization, to another priority rule of the plurality of priority rules for sidelink synchronization based at least in part on expiration of a time window for validity of the priority rule.

12. The UE of claim 1, wherein the one or more processors are further configured to:
receive an updated mapping indication that indicates an updated mapping between the plurality of network energy saving modes and the plurality of priority rules for sidelink synchronization; and
switch from the priority rule, of the plurality of priority rules for sidelink synchronization, to another priority rule of the plurality of priority rules for sidelink synchronization based at least in part on the updated mapping between the plurality of network energy saving modes and the plurality of priority rules for sidelink synchronization.

13. The UE of claim 12, wherein the updated mapping indication is included in sidelink control information (SCI), a dedicated physical sidelink control channel (PSSCH) communication, a sidelink wake-up signal (SL-WUS), a PC5 medium access control (MAC) control element (MAC-CE), or a PC5 radio resource control (RRC) message.

14. The UE of claim 1, wherein the one or more processors are further configured to:
transmit a sidelink communication that includes the mapping indication.

15. A method of wireless communication performed by a user equipment (UE), comprising:
receiving a mapping indication that indicates a mapping between a plurality of network energy saving modes and a plurality of priority rules for sidelink synchronization;
receiving a network energy saving mode indication that indicates scheduling for one or more network energy saving modes of the plurality of network energy saving modes; and
performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

16. The method of claim 15, wherein each priority rule, of the plurality of priority rules, indicates priorities for a set of sidelink synchronization sources, and wherein performing sidelink synchronization in accordance with a priority rule of the plurality of priority rules comprises:
performing sidelink synchronization based at least in part on a sidelink synchronization source, of the set of sidelink synchronization sources, in accordance with the priorities for the set of sidelink synchronization sources indicated by the priority rule.

17. The method of claim 15, wherein receiving the mapping indication comprises:
receiving, from a network node, a system information block (SIB) that includes the mapping indication.

18. The method of claim 15, wherein receiving the mapping indication comprises:
receiving, from a network node, a radio resource control (RRC) message that includes the mapping indication.

19. The method of claim 15, wherein receiving the mapping indication comprises:
receiving, from another UE, a sidelink communication that includes the mapping indication.

20. The method of claim 19, wherein the mapping indication is included in sidelink control information (SCI), a dedicated physical sidelink control channel (PSSCH) communication, a sidelink wake-up signal (SL-WUS), a PC5 medium access control (MAC) control element (MAC-CE), a PC5 radio resource control (RRC) message, or a sidelink broadcast channel communication.

21. The method of claim 15, wherein the priority rule, of the plurality of priority rules, is associated with a current network energy saving mode.

22. The method of claim 15, wherein the priority rule, of the plurality of priority rules, is based at least in part on a current network energy saving mode and one or more future network energy saving modes indicated by the network energy saving mode indication.

23. The method of claim 22, wherein the one or more future network energy saving modes include one or more future network energy saving modes scheduled in a time window from a current time.

24. The method of claim 15, further comprising:
receiving a network energy saving mode change notification; and
switching from the priority rule, of the plurality of priority rules for sidelink synchronization, to another priority rule of the plurality of priority rules for sidelink synchronization based at least in part on the network energy saving mode change notification.

25. The method of claim 15, further comprising:
switching from the priority rule, of the plurality of priority rules for sidelink synchronization, to another priority rule of the plurality of priority rules for sidelink synchronization based at least in part on expiration of a time window for validity of the priority rule.

26. The method of claim 15, further comprising:
receiving an updated mapping indication that indicates an updated mapping between the plurality of network energy saving modes and the plurality of priority rules for sidelink synchronization; and
switching from the priority rule, of the plurality of priority rules for sidelink synchronization, to another priority rule of the plurality of priority rules for sidelink synchronization based at least in part on the updated mapping between the plurality of network energy saving modes and the plurality of priority rules for sidelink synchronization.

27. The method of claim 26, wherein the updated mapping indication is included in sidelink control information (SCI), a dedicated physical sidelink control channel (PSSCH) communication, a sidelink wake-up signal (SL-WUS), a PC5 medium access control (MAC) control element (MAC-CE), or a PC5 radio resource control (RRC) message.

28. The method of claim 15, further comprising:
transmitting a sidelink communication that includes the mapping indication.

29. A non-transitory computer-readable medium storing a set of instructions for wireless communication, the set of instructions comprising:
one or more instructions that, when executed by one or more processors of a user equipment (UE), cause the UE to:
receive a mapping indication that indicates a mapping between a plurality of network energy saving modes and a plurality of priority rules for sidelink synchronization;
receive a network energy saving mode indication that indicates scheduling for one or more network energy saving modes of the plurality of network energy saving modes; and
perform sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

30. An apparatus for wireless communication, comprising:
means for receiving a mapping indication that indicates a mapping between a plurality of network energy saving modes and a plurality of priority rules for sidelink synchronization;
means for receiving a network energy saving mode indication that indicates scheduling for one or more network energy saving modes of the plurality of network energy saving modes; and
means for performing sidelink synchronization in accordance with a priority rule of the plurality of priority rules for sidelink synchronization based at least in part on the scheduling for the one or more network energy saving modes and the mapping between the plurality of network energy saving modes and the plurality of priority rules for sidelink synchronization.

* * * * *